May 1, 1928.
G. N. HEIN
1,668,315
COUPLING AND LOCKING DEVICE FOR SYRINGES
Filed June 21, 1926
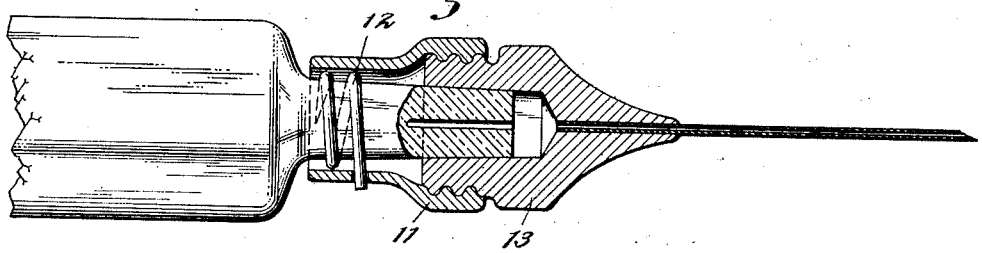
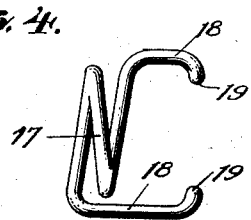
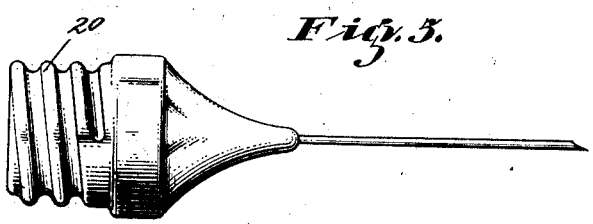
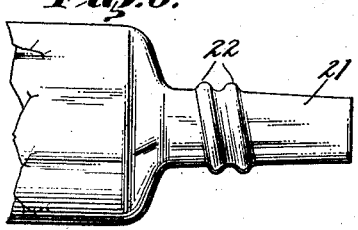
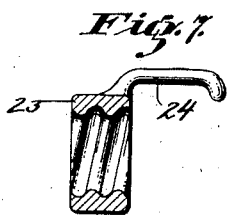
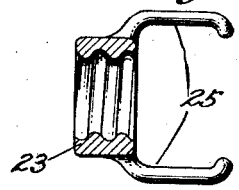
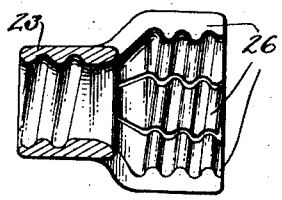
INVENTOR.
George N. Hein
BY
Townsend, Loftus + Abbett
ATTORNEYS.

Patented May 1, 1928.

1,668,315

UNITED STATES PATENT OFFICE.

GEORGE N. HEIN, OF SAN FRANCISCO, CALIFORNIA.

COUPLING AND LOCKING DEVICE FOR SYRINGES.

Application filed June 21, 1926. Serial No. 117,424.

This invention relates to a coupling or locking device for connecting a needle to a syringe, more especially a type of syringe known as the "Luer," wherein the nozzle of the syringe is tapered and smooth, so as to form a slip-joint fit with the base of the needle. There is considerable demand for means for locking such needles in place on the nozzle, and such a coupling or locking device, to be practical, must be simple and quick in its action.

In the present application I disclose several different forms of quick-acting couplings suitable for locking the needle to the nozzle of a syringe.

Fig. 1 shows a syringe and needle connected together by means of a coupling and locking device embodying my invention;

Fig. 2 shows a modified form of spring locking device;

Fig. 3 shows a side elevation of a needle base to receive the spring lock of Fig. 2;

Fig. 4 shows a further modification of a spring locking device;

Fig. 5 shows a side elevation of a needle base adapted for use with the locking device of Fig. 4;

Fig. 6 shows a side elevation of the nozzle end of a syringe, wherein the nozzle for the greater portion of its length is smooth and tapered, but is formed with one or two helical grooves or threads;

Figs. 7, 8, and 9 show modified forms of locks suitable for use with a syringe of the type indicated in Fig. 6.

With a glass barrel syringe having a tapered, smooth nozzle 10, shown in Fig. 1, I may employ a locking and coupling device comprising a drum-like coupling member 11 having arranged within it a spring locking device 12, said spring lock being in the form of a helical spring having one end anchored in the coupling member and the other end being adapted to fit over the nozzle of the syringe. By pressing inwardly and simultaneously turning the drum 11, the spring will grip the nozzle and securely retain the coupling member in place. This coupling member 11 is provided with threads to receive a needle base 13.

In Fig. 2 I show a locking spring 14 adapted to be twisted onto a nozzle similarly to the spring of Fig. 1, but having one end 15 extending at right angles, so as to enter a bayonet slot or groove 16 in the base of the needle, shown in Fig. 3.

In Fig. 4 a locking spring is shown having a coiled portion 17 with both ends 18 extending in parallelism and formed with inward projections 19 to co-act with screw threads 20 on the needle base shown in Fig. 5.

In Fig. 6 is shown a syringe having a tapered nozzle 21, but formed with one or two helical grooves or threads 22 to receive a similarly threaded coupling member 23. As shown in Fig. 7 this coupling member 23 may have one spring arm 24, or as in Fig. 8, two such spring arms 25, or as in Fig. 9, several spring arms or claws 26, adapted to co-operate with threads on a needle base similar to the one shown in Fig. 5.

In all of these devices a quick and simple means is provided for securing the needle base to the syringe, where a tapered slip-joint is desired between the needle and the nozzle of the syringe.

In the form shown in Figs. 2 to 9 inclusive the locking device can be readily fitted onto the nozzle of the syringe and is provided with one or more spring arms capable of being interlocked with the base of the needle by imparting to the latter an inward thrust and slight twist or turn. The device is very positive in its action, and being detachable from the nozzle of the syringe, can be removed and applied to another syringe in case of breakage of the old syringe.

Various changes in the construction and arrangement of the several parts may be employed, without departing from the spirit of my invention as disclosed in the appended claims.

Having thus described my invention, what I claim and desire to secure by Letter Patent is:

1. A coupling and locking device for a tapered slip-joint connection between a syringe nozzle and needle base, comprising helical grooves formed on the needle base and a spring having a coiled portion to frictionally engage the nozzle, and an arm to co-operate with the grooves on the needle base and interlock therewith.

2. A coupling and locking device for a tapered slip-joint connection between a syringe nozzle and a needle base, comprising a spring having a coiled portion adapted to be frictionally held on the nozzle and having an arm extending axially from the coil, for interlocking engagement with the needle base.

3. A needle for a hypodermic syringe, comprising a base formed with a smooth, tapered bore to receive the nozzle of a syringe said bore having formed on its periphery a helical groove to receive a coupling member for securing the needle to the syringe.

GEORGE N. HEIN.